July 17, 1956  L. A. GERSTMAYR  2,754,896
SAFETY GAS COCKS
Filed Jan. 14, 1952  3 Sheets-Sheet 1
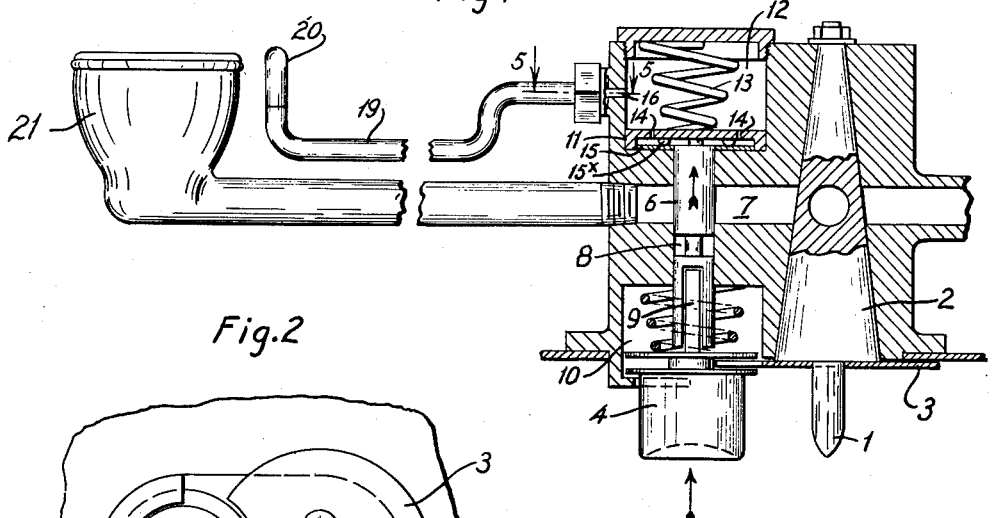
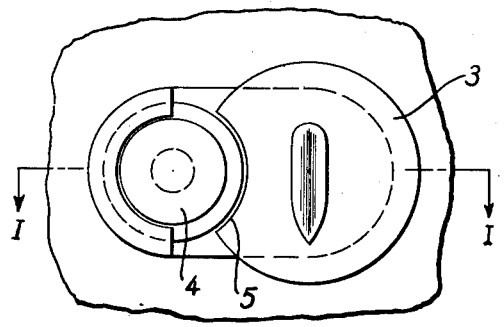
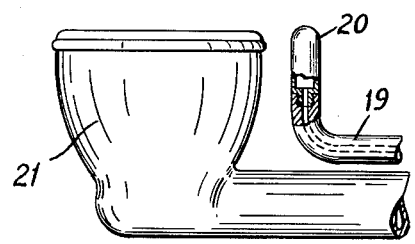
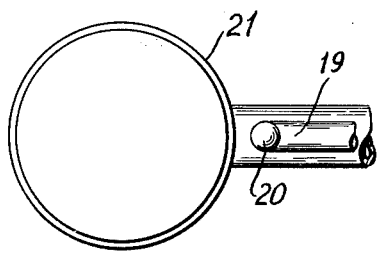
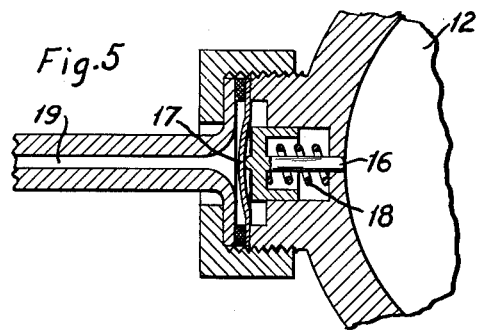
INVENTOR
Leonhard Andreas Gerstmayr

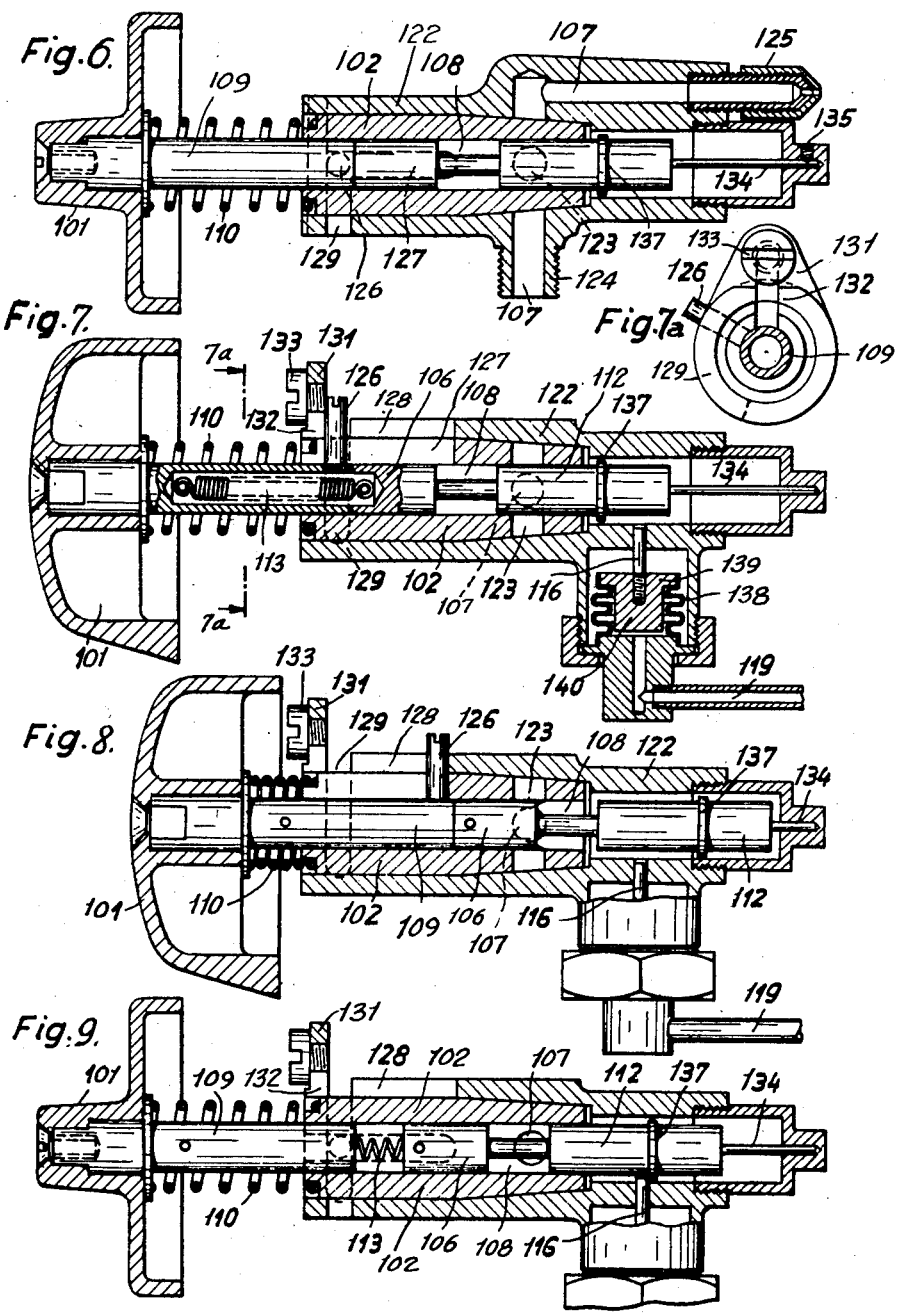

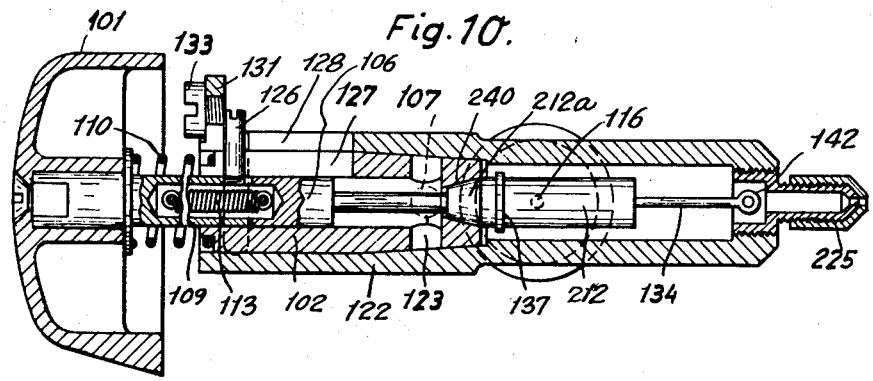
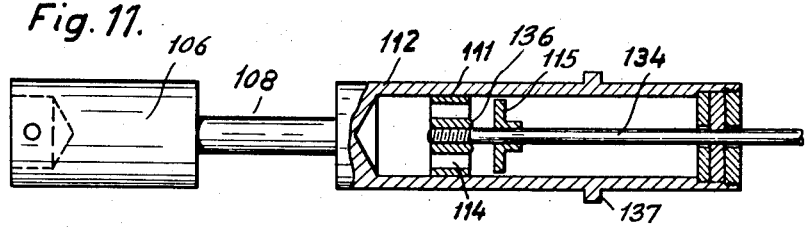
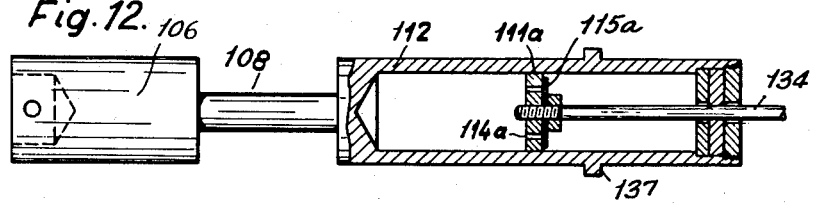
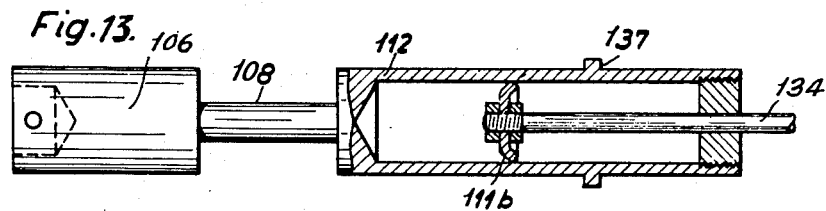

United States Patent Office 2,754,896
Patented July 17, 1956

2,754,896

SAFETY GAS COCKS

Leonard A. Gerstmayr, Munich, Germany, assignor to Wolfgang Spitzer, Starnberg, Germany Application January 14, 1952, Serial No. 266,426

9 Claims. (Cl. 158—134)

Gas-heated appliances can become a source of danger if the gas tap is unwittingly turned on by accident or the flame is extinguished by a draught or by liquid boiling over and its extinction is not noticed; for gas then streams into the room and may cause poisoning or an explosion. The purpose of the present invention is to reduce or remove the risk of gas streaming out continuously when the burner is not lit, and to frustrate even malicious attempts to produce that result, say by a would-be suicide, as well as preventing mischief by children. The invention is applicable to any gas-heated appliance having a burner to which gas is supplied through a conduit, including not only gas fires and furnaces, gas lighting fittings and cooking stoves, but also such apparatus as gas-operated refrigerators.

The method by which the invention prevents the continuing escape of non-ignited gas is to control the flow of gas through the supply conduit by a slow-acting self-closing valve and to use the heat of the burner to bring into action a detent by which the valve is prevented from closing; if the burner is not lit the valve closes.

This valve will be opened by hand; to prevent mischief resulting from an attempt to hold it open it is desirable to make the valve supplementary to an ordinary gas cock, to open it by the aid of an independent hand-operated actuator, and to interlock the actuator with the cock so that the cock cannot be turned on while the actuator is in operation, nor the actuator be operated while the gas cock is open.

A principal object of the invention is therefore the combination with a gas-heated appliance of a slow-acting self-closing auxiliary valve in the gas supply conduit and a detent mechanism heated by the burner and when heated preventing closing of the auxiliary valve.

A more specific object of the invention is the combination with the burner, supply conduit and cock of a gas-heated appliance, of an auxiliary valve in the gas conduit, restoring means tending constantly to close the valve, a hand-operated actuator for opening the valve, means interlocking the actuator with the cock to prevent operation of the actuator while the cock is open, and prevent opening of the cock while the actuator is operated, a retarder slowing the closing of the valve, and a detent mechanism heated by the burner and operating when hot to prevent closing of the valve.

In design the retarder must be related to the detent mechanism in regard to their respective times of action; for the closing of the auxiliary valve must be delayed long enough for the burner to be lit, for it to heat the detent mechanism and for the mechanism to come into action; the detent mechanism should therefore have small heat capacity.

With this in view a further particular object of the invention is a detent mechanism comprising a gas or air filled expansion chamber to be heated by the burner, a diaphragm closing the chamber, and a detent actuated by the diaphragm for obstructing the closing of an auxiliary valve in the gas supply conduit. Little heat is needed to expand the air; and the diaphragm and detent, which must be adjacent the valve, can easily be at a distance from the principal bulk of the chamber, which must be adjacent the burner, connection between this main part of the chamber and the diaphragm being made through a narrow pipe.

The retarder may be of the nature of a dash-pot employing either liquid or air. Since it is required to delay only the closing of the auxiliary valve it should have a one way valve in its piston, or the equivalent thereof.

A further object of the invention is a structurally combined gas cock and auxiliary valve having a common hand-operated actuator and incorporating interlock devices which limit the actuation of the cock and valve in the manner above indicated. This and yet other objects of the invention are more fully described with reference to the accompanying drawings and pointed out in the appended claims. In the drawings, Figure 1 is an aseembly view of one construction of the invention shown partially in section, Figure 2 is an elevational view of the controls of the valves shown in Fig. 1, Figure 3 is an elevational view of the gas burner and the expansion chamber beside it, Figure 4 is a plan view corresponding to Figure 3, Figure 5 is an enlarged fragmentary cross section along lines 5—5 of Fig. 1, Figures 6 and 7 are an axial sectional elevation and plan respectively of a second construction of the invention;

Figure 7a is a cross section of this construction on the line 7a—7a of Figure 7, Figure 8 is an axial sectional plan of it showing the auxiliary valve in one extreme position, and Figure 9 is a similar section of this construction in working position;

Figure 10 is a section corresponding with Figure 7 of a modified construction of the device; and Figures 11 to 13 are views on a larger scale, partly in section, of alternative constructions of retarder.

Like reference characters designate corresponding parts in the figures.

In Figures 1 and 2, the grip 1 on the plug 2 of the gas tap has secured to it a locking plate 3, the margin of which extends into the path of press button 4, which serves to actuate an auxiliary valve. As seen in Figure 2, there is an arcuate cut-out 5 in the plate 3, which allows the passage of the press button when the cock 2 is closed. The auxiliary valve is constructed as a slide valve with a cylindrical valve body 6 lying across the gas conduit 7. A part 8 of reduced section in this valve body allows the passage of gas to the burner when the valve body has been moved in the direction of the arrow of Figure 1 until the part of reduced section registers with the gas conduit. The actuating press button 4 is not attached to the valve body, but has a stem 9 engaging in a blind bore in the valve body to provide a lost motion engagement therewith, so the press button 4 when released is returned by the spring 10 to the position shown in Figure 1 irrespective of the valve body 6 following it. At its other end the valve body carries a retarder comprising a dash pot piston 11 moving in a cylinder 12 under the pressure of a spring 13. The cylinder is filled with a suitable fluid. There are openings 14 in the dash pot piston 11, and the face of the piston next to the valve 6 is recessed to receive a plate 15 which forms with the openings 14 a leaky non-return valve. The plate 15 is prevented from closing the openings 14 in fluid tight fashion by protuberances 15x.

Intermediate in the length of the retarder cylinder 12 there opens into it a bore in which slides a detent locking pin 16. The construction and operation of this detent may be seen from Figure 5. It is actuated by a diaphragm 17 and pushed out of action by a spring 18. The diaphragm is controlled by air pressure conveyed through the pipe 19 from an expansion chamber 20 arranged in close proximity to the gas burner 21 (Figures 3 and 4).

The device works as follows:

When the parts are in the position shown in Figure 1, the opening of the gas cock 1, 2 has no effect because the gas passage 7 is closed by the valve body 6. So the button 4 must be pressed. But it can only be pressed when the gas cock is closed, for only then is the cut-out 5 in the disc 3 in register with the press button 4. The button is pressed in the direction of the arrow in Figure 1 and pushes the valve body 6 inwardly until its reduced section 8 registers with the gas passage 7. When the press button is released, it returns to its original position under the action of its return spring 10, partly withdrawing its stem 9 from the valve body. The cock 2 can then be opened and the gas can be lit. When the valve body was moved inwardly, the retarder piston 11 moved with it; and it moved inwardly quite easily because the openings 14 permitted ready flow therethrough of the dash-pot fluid which pressed the plate 15 away from the openings 14. The continuously urge spring 13 tends to return the piston 11 and the valve body 6 outwardly to their original positions; but this return can take place only slowly because the plate 15 nearly seats against the openings 14 and greatly retards the backward flow of fluid through them. The dash-pot is so designed that complete return of the valve body 6 requires a predetermined time, for instance of the order of 30 seconds.

But during this time the ignited gas flame has been heating the expansion chamber 20, the air in the chamber has expanded and put pressure upon the diaphragm 17, and the diaphragm has consequently pressed the detent pin 16 into the dash pot cylinder 12 on the valve side of the piston 14. So the piston 14 and valve 6 cannot return and the gas passage 7 remains open.

Should the flame become extinguished through any unforeseen cause, and the user not notice it, the air in the expansion chamber 20 cools, the diaphragm 17 is drawn back to its original position and the return spring 18 pulls the pin 16 out of the cylinder 12, so allowing the dash-pot piston 11 to pass. This piston therefore returns to its original position under the pressure of its return spring 13, carrying with it the valve body 6 which closes the gas passage 7.

The disc 3 with its arcuate cut-out 5 serrves as an interlock between press button 4 and the gas cock and so makes it impossible, deliberately or with a view to suicide or the like, to get a steady outflow of gas. The press button 4 can only be pushed in when the gas cock is closed. If the gas cock is then opened and the gas not lit, the auxiliary valve 6 closes the gas passage within the predetermined time of say 30 seconds, and the user can do nothing about it. When the auxiliary valve is closed, the button cannot be actuated again until the gas cock 2 has been closed. So to get a lasting outflow of gas, it is necessary to operate the press button and the gas cock alternately at intervals of about 30 seconds. It is not to be expected that that will happen. Even an intending suicide, though he might thus alternately actuate the gas cock and press button for some time, would soon be prevented from so doing by the poisoning action of the gas.

In the construction of Figures 6 to 9, the gas cock 102 is revoluble in a housing 122 and a tranverse bore 123 through it enables it to open or close the gas passage 107. This passage terminates at the one end in a screw connection 124 for the gas supply and at the other end in the nozzle 125 for the gas burner. The valve body 106 slides in a bore in the cock 102, so that its part of reduced section 108 can be brought into register with the transverse bore 123 of the cock to allow passage of gas. The valve body 106 is itself bored at one end to receive one end of a tension spring 113, the other end of which is anchored in a co-axial bore in the stem 109 of the grip 101, so that the valve body and stem are drawn together. The grip 101 is secured in non-rotatable fashion upon its stem, for instance it may fit and be secured by a screw upon the flattened end of the stem.

The stem 109 carries a laterally projecting pin 126 which is screwed into it and which can slide in a slot 127 running lengthwise in the cock 102. Thus the stem can slide relatively to the cock but not turn relatively to it. Movement of the stem into the cock is resisted by spring 110. Such movement is only possible when the cock is closed, in which position its longitudinal slot 127 registers with a longitudinal slot 128 in the housing 122, through which also the pin 126 extends. The stem 109 and cock can be turned together only when the grip is in the outer position shown in Figures 6 and 7 in which its pin 126 registers with a circumferential slot 129 in the housing 122.

The pin 126 also serves to keep the cock upon its seat. As seen in Figures 7 and 7a, there is a lug 131 upon the housing 122 in which is a slot 132, the outer end of which can be plugged by a screw 133. When the screw is removed, the pin 126 can pass through the slot, which makes it possible to assemble the cock 102 in the housing. When the screw is screwed home it forms an abutment for the pin 126 and so keeps the cock in position.

The end part 112 of the valve body 106 is bored to serve as a cylinder for the dash pot system 111 (Figure 11), the piston rod 134 of which is secured in the end of the housing 122, for instance by a grub screw 135 (Figure 6). There are openings 114 in the piston for the dash pot fluid and these can be nearly but not quite closed by the disc 115 which is held off them by the protuberances 136.

Upon the end part 112 of the valve body is a collar 137 to co-operate with the locking pin 116 which is controlled by the air in an expansion chamber (not shown). This chamber is near the gas flame and is connected by the pipe 119 with the interior of a resilient metal bellows 138, which is closed by a plate 139. This plate carries the locking pin 116 and has a block 140 on its other side, the only purpose of which is to reduce the effective volume of the bellows.

The device works as follows:

The grip 101 is first thrust into the cock against the action of the spring 110 until the pin 126 sliding in the slots 127 and 128 reaches the end of the slots (Figure 8). In this movement, the valve body 106 is also pushed along the bore in the cock 102 and so is the cylinder 112, which forms part of it, while the piston 111 and piston rod 134 remain stationary (Figure 11); consequently the dash pot fluid passes through the openings 114, lifting the disc 115 from them, and enters the right hand end of the cylinder 112.

When the grip 101 is released, it is returned by the spring 110 to its initial position (Figure 9), but because of the dash pot action the valve body 106 cannot follow this movement; it is held back and the spring 113 is tensioned.

Then by turning the grip 101 the pin 126 is caused to turn the cock 102 and the gas is lit. The heat of it immediately expands the air in the expansion chamber (not shown) at the outer end of the pipe 119, and the air pressure is fed through the pipe 119 to the resilient metal bellows 138 so that the pin 116 is pushed out against the cylinder 112, as seen in Figure 9, and by engaging the collar 137 prevents the cylinder, and the valve 106 of which it forms part, from returning. So the gas passage remains open, since the reduced part 108 of the valve body is in register with the cross bore 123.

As soon as the gas flame is extinguished from any cause, the air in the expansion chamber contracts, and the metal bellows 138 resiliently contracts also, pulling the pin 116 out of the path of the collar 137. The valve 106 can therefore return completely under the action of the spring 113 and cut off the gas supply.

A particularly compact construction of the invention is shown in Figure 10. Here the nozzle 225 is co-axial with the cock 102 and with the auxiliary valve. The latter is formed by the conical end 212a of the cylinder 212 and a seat 240 in the cock 102 and connects the gas passage 107 with the part of the housing surrounding the dash-pot cylinder and terminating in the nozzle 225. The piston rod 134 of the dash-pot piston is anchored at 142 in the nozzle. This construction works exactly like that described with reference to Figures 6 to 9.

Figures 12 and 13 show modified constructions of the dash-pot for the valve 106.

In Figure 12 an air-filled dash pot is employed; the openings 114a in the piston 111a are much smaller than the openings in the piston 111, and the disc 115a abuts directly on the piston, so as to close these openings. Air returns during dash-pot action around the piston.

In Figure 13, a simple friction brake is employed. In place of the piston 111 there is provided a friction disc 111b coned at its periphery so that it produces substantially higher friction in the direction of movement for closing the auxiliary valve than in the other.

I claim:

1. A gas control means for gas-heated appliances having a burner and a conduit supplying gas thereto, comprising a plug-type cock in said conduit opened and closed by rotation of its plug, a self-closing slide valve in said conduit co-axial with said cock, a common hand grip for opening said slide valve by axial motion of said grip and opening said cock by rotation of said grip, a detent mechanism heated by said burner and when heated obstructing the closing of said slide valve, means for slowing the closing rate of said valve to a metered rate, and interlocking means preventing the simultaneous axial and rotative motion of said grip.

2. A gas control means for gas-heated appliances having a burner and a conduit supplying gas thereto, comprising a plug-type cock in said conduit opened and closed by rotation of its plug, a self-closing slide valve moving in an axial bore in the plug of said cock, a common hand grip for opening said slide valve by axial motion of said grip and opening said cock by rotation of said grip, a detent mechanism heated by said burner and when heated obstructing the closing of said slide valve, means for slowing the closing rate of said valve to a metered rate, and interlocking means preventing the simultaneous axial and rotative motion of said grip.

3. A gas control means for gas-heated appliances having a burner and a conduit supplying gas thereto, comprising a plug-type cock in said conduit opened and closed by rotation of its plug in a housing, a slow-acting self-closing slide valve moving in an axial bore in the plug of said cock, a common hand grip for opening said slide valve by axial motion of said grip and opening and closing said cock by rotation of said grip, a dash pot fixed to the end of said slide valve and adapted to retard closing thereof, a pin reciprocating with said hand grip in slots in the plug and housing of said cock which register when the cock is closed and rotatable with said hand-grip in a circumferential slot in said cock housing when said hand-grip is fully withdrawn, and a detent mechanism heated by said burner and when heated obstructing the closing of said slide valve.

4. A gas control means for gas-heated appliances having a burner and a conduit supplying gas thereto, comprising a plug-type cock in said conduit opened and closed by rotation of its plug, a self-closing slide valve moving in an axial bore in the plug of said cock, a common hand grip for opening said slide valve by reciprocation of the grip and opening and closing said cock by rotation of the grip, a dash-pot fixed to the end of said slide valve and adapted to retard closing thereof, a detent mechanism heated by said burner and when heated obstructing the closing of said slide valve, and interlocking means to prevent simultaneous reciprocation and rotation of said hand grip.

5. A safety device for use with gas-heated appliances having a burner, and having a conduit supplying gas thereto through a hand operated cock, said device comprising an auxiliary valve in said conduit; a hand-operated actuator for moving said valve to an open position; restoring means between said conduit and said valve and constantly urging said valve toward a closed position; retarder means connected with said valve and opposing said restoring means to slow the closing of said valve to a predetermined metered rate, said actuator extending outwardly of said conduit adjacent said cock and having at its inner end a lost-motion engagement with said valve whereby after the valve has been opened the actuator may be independently returned to its non-actuating position; detent means adjacent said valve and operated by heat from said burner to prevent closing of the valve while the burner is lighted; and mutually engaging interlock means on said cock and on said actuator operative therebetween to prevent operation of said actuator when said cock is open and to prevent opening of said cock while said actuator is being operated.

6. In a device as set forth in claim 5, said auxiliary valve being a slide valve in a bore transverse to said conduit, and said actuator being a press button for moving said slide valve toward the far end of said bore, and out of said conduit, the actuator button being spring-returned upon release to its outermost position, said restoring means, said detent means and said retarder means being in an extension of said bore on the other side thereof from said button.

7. In a device as set forth in claim 5, said auxiliary valve being a slide valve and said actuator being a spring-returned press button for moving said slide valve out of said conduit, and said interlock means comprising a flange on said cock extending toward and within a groove in said press button, the flange rotating with said cock and having a recess in its periphery conforming with the adjacent contour of the button, the recess being so located as to permit pushing of the button only when the cock is in off position, and the groove being so located on the button as to permit turning of the cock only when the button is in its outermost non-actuating position.

8. In a device as set forth in claim 5, said valve comprising a slide valve in a bore transverse to said conduit, said restoring means and said retarder means being located in an extension of said bore, the restoring means comprising a spring urging said valve toward said conduit and said retarder means comprising a fluid filled dash-pot having a piston attached to said valve and said extension bore comprising the dash-pot cylinder housing the piston.

9. In a device as set forth in claim 8, said detent means comprising a fluid filled tube adjacent said burner and closed at its outer end, the inner end of the tube being attached to a side of said extension bore and having a pin extending transversely into the bore, and engaging the inner end of the tube in a fluid tight sliding engagement, the pin being moved into the extension bore to prevent the piston and attached valve from being restored toward valve-closed position when the fluid in the tube is expanded by heat from the burner.

References Cited in the file of this patent

UNITED STATES PATENTS

| | | |
|---|---|---|
| 2,049,960 | Jones | Aug. 4, 1936 |
| 2,372,537 | Wantz | Mar. 27, 1945 |
| 2,484,301 | Lane | Oct. 11, 1949 |
| 2,572,274 | Miller | Oct. 23, 1951 |